Aug. 11, 1953     E. E. PENDLETON     2,648,255
SPECTACLE RETAINING DEVICE
Filed March 30, 1949

INVENTOR;
ELEANOR E. PENDLETON
BY
ATTORNEY.

Patented Aug. 11, 1953

2,648,255

UNITED STATES PATENT OFFICE 2,648,255

SPECTACLE RETAINING DEVICE

Eleanor E. Pendleton, St. Louis, Mo.

Application March 30, 1949, Serial No. 84,335

6 Claims. (Cl. 88—51)

This invention relates to improvements in spectacle retaining devices, and more particularly to a device which is easily attached to and removed from the mid portion of the temple bars of certain types of eyeglasses, in a manner to secure them against loss or misplacement, and to retain the spectacles in a captive position while avoiding any interference with wearing apparel or with the hair dress, particularly of women users, and yet in such location that the spectacles are instantly accessible for quick and easy reapplication when wanted. The present subject matter constitutes certain modifications of, and certain improvements over that of a copending application by this applicant, bearing Serial No. 21,689 filed April 17, 1948, and entitled Retainers for Spectacles, now Patent No. 2,481,946, issued September 13, 1949.

The principal objectives of the present invention are to provide a low-cost, attractive captive device for spectacles of such nature that a flexible tie element or band may remain attached as to the temple pieces of the spectacles over long periods of their usage, and will serve to assure against loss of the spectacles by inadvertent dropping thereof; maintaining the spectacles in a position entirely comfortable to the wearer, ready for easy reapplication, between periods of wear of the eyeglasses, and which will in no manner disturb the hair dress, garments, or other attributes of wearer appearance.

A further important objective of the present improvements is attained in a device for yieldably gripping in a zone between their ends, each of the bows or temples of prevalent types of spectacles, and which may be readily applied or removed by anyone without special skill, and requiring no structural change over, or departure from prevalent types of eyeglasses.

Still another object of the present invention is realized in a unique, novel and advantageous combination of a rubber or rubber-like gripping band for temples of the spectacles assembled to a metal clip for attachment to a ribbon, chain or the like, which normally extends about the neck of the wearer, the attachment clip being of such nature as to permit a separation of parts of the clip for renewal of the gripping band, as may be necessary after long periods of usage.

The foregoing and many further objects will become apparent from a study of the ensuing description of an advanced embodiment of the invention, particularly when considered in connection with the accompanying drawing, in which.

Figure 1:
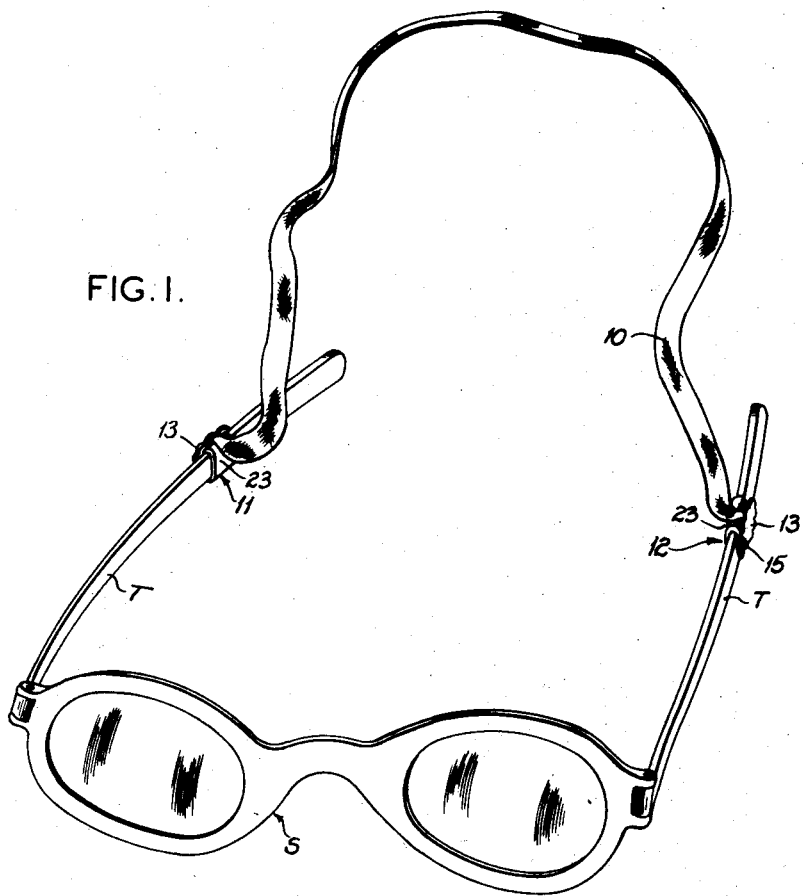
Fig. 1 is an isometric view showing the device connected to the temple elements of a pair of spectacles.
Figure 2:
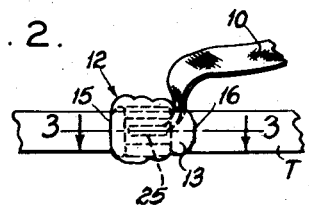
Fig. 2 is a fragmentary, somewhat enlarged, side view of an attachment clip and related elements, showing also a portion of one of the temple pieces of a pair of spectacles to which the device is applied.
Figure 3:
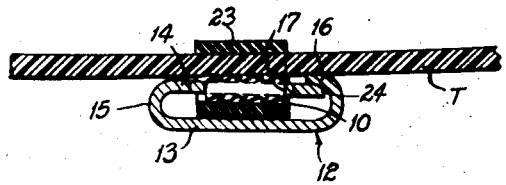
Figure 4:
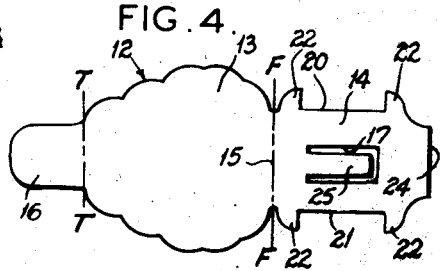

Fig. 3 is an enlarged sectional view in a horizontal plane, of the device shown by Fig. 2, and showing the relation between the elements of the metal attachment clip, a flexible tie element and an elastic band utilized to attach the clip to one of the temples, and Fig. 4 is a top or plan view somewhat enlarged as compared with Figs. 1 and 2, showing a blank for folding to form the metal elements of the clip, prior to assembly thereof to the elastic band and the flexible tie element.

Referring now to the drawing by the use of suitable reference characters correlated with the description herein, the combination of the captive retainer device with a pair of spectacles is not restricted as to type of spectacles except as to the requirement that the eyeglasses or spectacles, generally indicated at S, include bows or temple elements T, which may be of any conventional or other form such that the temple elements may be gripped by an elastic band. In the present assembly these are shown as they normally appear in sport glasses, sun glasses and those of other plastic-frame types, but solely by way of example and without restriction.

The captive device proper includes a flexible tie member shown as consisting of a ribbon 10, at each opposite end of which is attached a securement or clamp device, these being generally indicated at 11 and 12. Since the clamping devices on the opposite ends of the flexible tie element 10 are or may be identical, a description of one thereof will be equally applicable to and suffice for both.

Referring now more particularly to the attachment devices, each of these consists, in the example shown, of a short, endless elastic band, together with a metal attachment clip forming a convenient and attractive means for anchorage of the elastic band to the flexible tie element such as 10. For this purpose there is preferably utilized a strip of flexible metal which is or may be die formed to constitute a blank such as shown by Fig. 4. The blank as thus formed, includes a larger plate element which may be ornamental in character and without restriction as to material, of a sheet metal or other substance having the requisite strength and rigidity. The clip as shown, is formed to provide a larger plate portion 13 and a smaller plate portion 14. These are connected by a neck 15, which is shown as of a width approximating that of the normal width between lateral margins, of the plate 14. A fold line FF is indicated by location in Fig. 4, as is a second fold line TT, beyond which extends from the plate proper 13, a foldable securement tab or tongue 16 for a purpose hereinafter better appearing.

The smaller or inner plate portion 14 of the clip is preferably of a generally rectangular shaping, and is characterized by a central aperture in the form of a slot shown as rectangular and indicated at 17. Each of two opposite margins 20 and 21 of the plate 14 are so formed as to provide opposite pairs of extended ears 22, the ears 22 resulting in a partly rectangular space therebetween, these spaces serving to constitute seats for a short elastic attachment band 23, best appearing in Fig. 3. Although the band 23 may consist of any suitable elastic band stock, it is preferably of so-called endless character and may, as is desirable, be formed of a length of pure latex rubber stock, such for example as a section of surgical latex tubing. The length of tubing selected for this purpose corresponds approximately to the spacing between the adjacent ears 22 on the plate 14. If formed in this manner, the diameter of the tubing, hence the effective length of the band 23, is such that when applied over one of the temples T of the spectacles, the band will grip the temple under an appreciable tension, so as yieldably to resist displacement of the attachment device along the temple, and yet such as to permit its removal and attachment without objectionable effort.

As will later appear, and as is seen from Fig. 3, in assembly the plate elements 13 and 14 are in over- and under-lying relation, or otherwise expressed, the outermost and larger plate 13 overlies the plate 14, the fold at 15 being through substantially 180 degrees, and upon completion of assembly, the tongue 16, as will appear from Fig. 3, is folded over the end margin 24 of the plate portion 14. Thus the plates are held firmly in assembly at one end by the integral neck 15, and at the opposite end by the overfolded tongue.

The central aperture 17 in plate 14 is preferably of a length to conform to the width of the flexible tie element 10, assuming this latter to consist of a fabric strip or ribbon of ornamental character. A first step in assembly consists of introduction of one end of the tie element 10 through the opening 17. An integral tongue 25 may penetrate the tie element, or the latter may be wrapped about the tongue 25, the tongue being bent as closely as possible into the plane of element 14, and serves as a positive anchorage for the end of the member 10.

After attachment of the end of the tie element such as ribbon 10, to the plate 14 prior to folding of the clip, the stretchable band 23 is applied over the plate 14, with the band brought into its seats between the paired ears 22 of this plate. After such application of the stretchable band 23, the plate portion 13 is folded along line 15, to overlie and firmly to clamp together those parts of the assembly therebetween and now consisting of a portion of the end of the tie element 10 and the rubber or like band 23. The plate elements 13 and 14 are clamped firmly under some pressure over the parts noted, and the tongue 16 firmly and closely drawn back over the margin 24 in a manner best appearing from Fig. 3.

In the event it is desired, as may be necessary after a long period of use, to replace the resilient band members 23, the tongue 16 may be opened, the bands 13 and 14 again separated sufficiently to enable cutting away the old band, and the substitution of a new element 23 therefore.

With the two attachment devices, each including a clip and a band 23, thus assembled to the ends of the ribbon or other flexible tie element 10, the device is readily applied to the pair of spectacles by insertion of the bands 23 endwise over the free ends of the temples. This may be facilitated by moistening the temples to aid in sliding the bands inwardly as is preferred, from the temple ends to the desired position. The location of the clamping devices in respect to the temples is a matter partly of personal choice, and in the case of those worn by women, is or may be partly dictated by the particular hair dress of the wearer, and other subjective considerations. As a matter of general usage, however, it has been found that the attachment of the captive device to some intermediate portion of the temples, results in less disturbance of or interference with the hair dress, than were the ends of the device attached to the free extremities of the temple pieces, as is suggested in my copending application above referred to.

Although obviously some rearrangement of the elements of the clamping devices is possible, it is preferred, as shown and described, to form and locate clips 13—14 so that both plate elements thereof lie exteriorly of rather than with any metal part on the inside surface of the temple pieces. This conduces, now obviously, to a greater wearer comfort, and avoids any metallic or other uncomfortable protuberances along the inner temple surfaces.

Although the invention has been described by making specific reference to an advanced embodiment, the detail of description should be understood as instructive in character, rather than restrictive, inasmuch as numerous variants are possible within the scope of the claims hereunto appended.

I claim as my invention:

1. A spectacle retainer for use with a pair of spectacles characterized by temple elements, comprising a retainer device for keeping captive the spectacles between periods of their use, the device including a flexible band of chain and ribbonlike flexibility, a clamp secure to each end of the flexible band, each clamp serving to embrace and grip one of the temple pieces intermediate its ends, each clamp including a clip comprising a pair of unitary connected plates, one plate of each such pair having an end of the flexible band secured thereto, an elastic band looped around said one plate and of a size to extend around said plate, to receive a temple bar and to clamp the elastic band to the temple element of the spectacles, and the second plate marginally attached to and overlying the first said plate, the part of the elastic band and the part of the flexible band where said parts are connected to the first plate, the length of the flexible element being such as to extend loosely about the neck of the wearer when the spectacles are worn and further of a length to support the spectacles below the head of the user when the spectacles are removed, whereby the retaining device serves as a captor for the spectacles between periods of use.

2. A retainer for spectacles, consisting of a flexible band and a pair of temple clamps, one at each end of the band, each said clamp including a pair of superposed plates, consisting of a larger plate and a smaller plate, the smaller plate being provided with an aperture, one of the ends of the flexible band extending through the aperture, and being anchored to the clamp beyond the aperture, the larger of said plates normally overlying the smaller plate and closely assembled thereto in a manner tending to prevent withdrawal of the end of the flexible band from a position between the plates, each of said clips including a resilient circular band embracing the smaller plate of each clip beneath the larger plate, and of a size to be tensioned about one of the temple pieces of a pari of spectacles for attachment of the retainer ends thereto.

3. The combination and arrangement of elements as recited by claim 2, but further characterized in that both plates of each clip are arranged for location outside of the temple piece engaged thereby, and further characterized in that the elastic band associated with each clip, overlies the aperture in the smaller plate, and further including the provision of means for assembling adjacent free marginal portions of the plates in registering relation in the clip.

4. In a device for keeping captive a pair of spectacles having temple bars in a state of repose below the neck of the wearer, and in a position to facilitate their application to a normal wearing position, a tie element of flexible character, fastening clips consisting of two plates, there being one such clip at each end of the tie element for location in holding relation to an intermediate portion of the temple bars of the spectacles, each such clip consisting of a folded metal strip formed to provide the pair of plates aforesaid connected by an integral neck of metal, one of said plates having an aperture therethrough, and being provided on each of two opposite margins of the plate with a pair of spaced lateral projections, an elastic band looped around the plate and seated between the paired projections and sized to expansibly fit over the temple piece of the spectacles, the tie element extending through and secured just beyond the aperture against removal from the plate, the elastic band overlying the aperture in said plate, and the adjacent end portion of the flexible tie element, the second said plate of each clip being provided with a tongue folded in overlying relation to the margin of the one said plate, and coacting with the folded neck between the plates to clamp the plates together and position the elastic band in the clip over the end of the flexible tie element.

5. In combination, a retainer device for use with a conventional spectacle frame having a lens frame and temple bars extending backwardly therefrom and passing over the ears of a wearer; the retainer device comprising a flexible elongated element of ribbon and chain-like flexibility, and attachment devices at the ends thereof; the flexible element having a length such that the spectacle frame and retainer device form a loop of a size freely to pass over the head of a wearer, and to permit the spectacles to be withdrawn from the ears, whereby the spectacle frame may be worn conventionally with the elongated element hanging loosely behind the head of the wearer or may be suspended from the neck of the wearer with the frame on the wearer's chest, each attachment means comprising a clamping member removably attachable to conventional temple bars, the clamping member having readily expansible and contractible means normally resiliently and elastically contracted, but freely yieldable to expansion to be fitted onto, or removed from, the temple bar at will, and by contraction to engage securely on the temple bar to enable the spectacles to be supported by suspension upon the elongated element around the neck of the wearer, and means to fasten the clamping members to the ends of the elongated element without interfering with the free expansion of the clamping members; wherein each clamping member is a tubular piece of gum rubber or the like, and each fastening means comprises rigid parts secured to the tubular piece on only one side thereof, whereby the tubular piece may freely expand over a temple bar, and be slid therealong.

6. In combination, a retainer device for use with a conventional spectacle frame having a lens frame and temple bars extending backwardly therefrom and passing over the ears of a wearer; the retainer device comprising a flexible elongated element of ribbon and chain-like flexibility, and attachment devices at the ends thereof; the flexible element having a length such that the spectacle frame and retainer device form a loop of a size freely to pass over the head of a wearer, and to permit the spectacles to be withdrawn from the ears, whereby the spectacle frame may be worn conventionally with the elongated element hanging loosely behind the head of the wearer or may be suspended from the neck of the wearer with the frame on the wearer's chest, each attachment means comprising a clamping member removably attachable to conventional temple bars, the clamping member having readily expansible and contractible means normally resiliently and elastically contracted, but freely yieldable to expansion to be fitted onto, or removed from, the temple bar at will, and by contraction to engage securely on the temple bar to enable the spectacles to be supported by suspension upon the elongated element around the neck of the wearer, and means to fasten the clamping members to the ends of the elongated element without interfering with the free expansion of the clamping members; wherein each clamping member is a tubular piece of gum rubber or the like, and each fastening means comprises a rigid part attached to one part of the wall of the tubular member and another part overlying the first part and the said part of the wall of the tubular member, and wherein the end of the flexible element connected to the attachment means is attached beneath the said other part and is concealed thereby.

ELEANOR E. PENDLETON.

References Cited in the file of this patent
UNITED STATES PATENTS

| Number | Name | Date |
|---|---|---|
| 1,126,855 | Pilkington | Feb. 2, 1915 |
| 1,549,672 | Laxier | Aug. 11, 1925 |
| 1,819,738 | Daniels | Aug. 18, 1931 |
| 1,894,888 | Ponton | Jan. 17, 1933 |
| 1,973,648 | Nagal | Sept. 11, 1934 |
| 2,023,523 | Grimball | Dec. 10, 1935 |
| 2,475,634 | Neumann | July 12, 1949 |
| 2,499,140 | Griffith, Jr. | Feb. 28, 1950 |

FOREIGN PATENTS

| Number | Country | Date |
|---|---|---|
| 376,978 | Germany | July 16, 1922 |

OTHER REFERENCES

Oxfords, Chains and Reels Catalog—August 1935, pages 14–16, August 1935—American Optical Company—Copy in Patent Office Library.